United States Patent
Wang et al.

(10) Patent No.: US 11,320,918 B2
(45) Date of Patent: May 3, 2022

(54) ACTIVE TOUCH PEN, TOUCH INPUT SYSTEM AND METHOD OF DRIVING THE SAME

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventors: Meng Wang, Beijing (CN); Guanglei Yang, Beijing (CN); Zhixiang Fang, Beijing (CN)

(73) Assignees: HEFEI BOE OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 64 days.

(21) Appl. No.: 16/760,298

(22) PCT Filed: Sep. 18, 2019

(86) PCT No.: PCT/CN2019/106421
§ 371 (c)(1),
(2) Date: Apr. 29, 2020

(87) PCT Pub. No.: WO2020/057544
PCT Pub. Date: Mar. 26, 2020

(65) Prior Publication Data
US 2020/0341564 A1    Oct. 29, 2020

(30) Foreign Application Priority Data

Sep. 21, 2018 (CN) .......................... 201811107720.2

(51) Int. Cl.
*G06F 3/038* (2013.01)
*G06F 3/0354* (2013.01)
(Continued)

(52) U.S. Cl.
CPC ........ *G06F 3/0383* (2013.01); *G06F 3/03545* (2013.01); *G06F 3/0442* (2019.05); *G06F 3/04162* (2019.05)

(58) Field of Classification Search
None
See application file for complete search history.

(56) References Cited

U.S. PATENT DOCUMENTS 5,248,855 A * 9/1993 Cambridge ......... G06F 3/03545
178/19.01
5,548,092 A * 8/1996 Shriver ................. G06F 3/0346
178/19.01
(Continued)

FOREIGN PATENT DOCUMENTS

CN 201142063 Y 10/2008
CN 101900613 A 12/2010
(Continued)

OTHER PUBLICATIONS

Office Action of CN Application No. 201811107720.2 and English translation, dated Feb. 3, 2020, 19 pages.
(Continued)

*Primary Examiner* — Kent W Chang
*Assistant Examiner* — Peijie Shen
(74) *Attorney, Agent, or Firm* — Muncy, Geissler, Olds & Lowe, PC

(57) ABSTRACT

An active touch pen, a touch input system and a method of driving the same are provided. The active touch pen includes a pen tip and a pen body, where a control circuit and a signal supply circuit are in the pen body. The control circuit is configured to detect a detection parameter value corresponding to an inclination angle of the pen body, and adjust, according to the detection parameter value, a signal amplitude of an output signal supplied by the signal supply circuit; an input end of the signal supply circuit is connected to an (Continued)

output end of the control circuit, to supply the output signal through the pen tip.

15 Claims, 7 Drawing Sheets

(51) Int. Cl.
*G06F 3/044* (2006.01)
*G06F 3/041* (2006.01)

(56) References Cited

U.S. PATENT DOCUMENTS

| | | | | |
|---|---|---|---|---|
| 5,981,883 | A * | 11/1999 | Shriver | G01L 5/00 178/18.01 |
| 6,880,257 | B1 * | 4/2005 | Fang | G01C 9/06 33/366.11 |
| 2003/0213136 | A1 * | 11/2003 | Klock | G01C 9/20 33/366.21 |
| 2004/0155612 | A1 * | 8/2004 | Krichtafovitch | H05H 1/48 315/500 |
| 2005/0001823 | A1 * | 1/2005 | Dort | G06F 3/03545 345/179 |
| 2006/0161362 | A1 * | 7/2006 | Jian | G01C 9/00 702/93 |
| 2006/0181505 | A1 * | 8/2006 | Dort | G06F 3/03545 345/156 |
| 2015/0097805 | A1 | 4/2015 | Mine et al. | |
| 2015/0160744 | A1 * | 6/2015 | Mohindra | G06F 3/0418 345/179 |
| 2015/0286293 | A1 * | 10/2015 | Gruhlke | G06F 3/03545 345/182 |
| 2016/0357292 | A1 * | 12/2016 | Suzuki | G06F 3/0442 |
| 2017/0083055 | A1 * | 3/2017 | Wu | G06F 1/3206 |
| 2017/0097696 | A1 | 4/2017 | Park et al. | |
| 2017/0106717 | A1 | 4/2017 | Mitani et al. | |
| 2017/0192539 | A1 * | 7/2017 | Fang | G06F 3/03545 |
| 2017/0262114 | A1 * | 9/2017 | Xie | G06F 3/044 |
| 2018/0312398 | A1 * | 11/2018 | Jung | G01N 27/07 |
| 2019/0025140 | A1 * | 1/2019 | Smith | G06F 3/0418 |
| 2021/0005695 | A1 * | 1/2021 | Jia | H01L 27/3276 |
| 2021/0124438 | A1 * | 4/2021 | Wang | G06F 3/016 |
| 2021/0124456 | A1 * | 4/2021 | Wang | G06F 3/0442 |

FOREIGN PATENT DOCUMENTS

| | | |
|---|---|---|
| CN | 104254821 A | 12/2014 |
| CN | 105511648 A | 4/2016 |
| CN | 106570624 A | 4/2017 |
| CN | 206147576 U | 5/2017 |
| CN | 108415591 A | 8/2018 |
| CN | 109240521 A | 1/2019 |
| JP | 2013222376 A | 10/2013 |
| WO | WO-2016/171986 A1 | 10/2016 |

OTHER PUBLICATIONS

International Search Report of PCT/CN2019/106421 and English translation, dated Nov. 29, 2019, 17 pages.

* cited by examiner

ACTIVE TOUCH PEN, TOUCH INPUT SYSTEM AND METHOD OF DRIVING THE SAME

CROSS-REFERENCE TO RELATED APPLICATIONS

This application is the U.S. national phase of PCT Application PCT/CN2019/106421 filed on Sep. 18, 2019, which claims a priority to Chinese Patent Application No. 201811107720.2 filed in China on Sep. 21, 2018, the disclosures of which are incorporated herein in their entirety by reference.

TECHNICAL FIELD

The present disclosure relates to the field of touch technology, and in particular, to an active touch pen, a touch input system and a method of driving the same.

BACKGROUND

The capacitive touch pen in the related art mainly has the passive touch pen and the active touch pen. When the passive touch pen touches the touch screen, it affects the coupling capacitor between the emitter and receiver of the touch screen, thereby generates a touch signal. The active touch pen serves as an emitter and forms a coupling capacitor with the receiver of the touch screen, so as to generate an output signal. In the related art, the active touch pen uses a pressure sensor to control the strength of the output signal. For example, the signal amplitude of the output signal may be controlled by detecting the contact pressure between the pen tip and the touch screen or detecting the pressure of the user's finger. The cost of this active touch pen is high, and the power consumption is large.

SUMMARY

An active touch pen is provided in the present disclosure, including a pen tip and a pen body, where a control circuit and a signal supply circuit are in the pen body;

the control circuit is configured to detect a detection parameter value corresponding to an inclination angle of the pen body, and adjust, according to the detection parameter value, a signal amplitude of an output signal supplied by the signal supply circuit;

an input end of the signal supply circuit is connected to an output end of the control circuit, and the output end of the signal supply circuit is connected to the pen tip, and the signal supply circuit is configured to supply the output signal through the pen tip.

Optionally, a resistance adjustment component is in the pen body, the resistance adjustment component is connected to the control circuit, and a resistance value of the resistance adjustment component increases or decreases with a change of the inclination angle of the pen body, and the control circuit is configured to control the signal amplitude of the output signal according to a change of the resistance value of the resistance adjustment component.

Optionally, the pen body includes an accommodating cavity, the resistance adjustment component is in the accommodating cavity, the resistance adjustment component includes a resistance element and a conductive liquid, a volume of the conductive liquid is smaller than a volume of the accommodating cavity;

the resistance element is through the accommodating cavity and is in electrical contact with the conductive liquid, and both ends of the resistance element are electrically connected to the control circuit.

Optionally, the accommodating cavity is columnar, and the resistance element is arranged along an axial direction of the accommodating cavity.

Optionally, the conductive liquid is an aqueous solution of a strong electrolyte, a material of the resistance element includes at least one of iron, tungsten and nickel-chromium alloy.

Optionally, the pen body includes an accommodating cavity, the resistance adjustment component is in the accommodating cavity, the resistance adjustment component includes a conductive element and a conductive liquid, a volume of the conductive liquid is smaller than a volume of the accommodating cavity;

one end of the conductive element is at an end of the accommodating cavity and is electrically connected to the control circuit, and the other end of the conductive element extends into the accommodating cavity and is in electrical contact with conductive liquid in the accommodating cavity.

Optionally, there exist two conductive elements, and the two conductive elements are arranged at two ends of the accommodating cavity respectively.

Optionally, the conductive liquid is an aqueous solution of a strong electrolyte, a material of the conductive element includes copper or graphite.

Optionally, the active touch pen further includes a resistance control switch configured to control an on-off of the resistance adjustment component.

Optionally, the pen body includes an accommodating cavity, the resistance adjustment component is in the accommodating cavity, the resistance adjustment component includes a resistance element and a conductive liquid, a volume of the conductive liquid is smaller than a volume of the accommodating cavity;

the resistance element is in electrical contact with the conductive liquid, and an end of the resistance element is electrically connected to the control circuit.

Optionally, the accommodating cavity includes a first end surface, the end of the resistance element includes a first end, and the first end of the resistance element is electrically connected to the control circuit through the first end surface.

Optionally, the accommodating cavity further includes a second end surface opposite to the first end surface, and the end of the resistance element further includes a second end, and the second end of the resistance element is electrically connected to the second end surface of the accommodating cavity.

Optionally, a length of the resistance element in an axial direction of the accommodating cavity is equal to a length of the accommodating cavity in the axial direction of the accommodating cavity.

Optionally, the resistance element includes a disconnection portion extending in an axial direction of the accommodating cavity, to disconnect the resistance element in the axial direction of the accommodating cavity, the conductive liquid is filled in the disconnected portion.

A touch input system is provided in the present disclosure, including a touch component and an active touch pen, where the active touch pen is the active touch pen hereinabove;

the touch component includes a plurality of touch electrodes and a touch chip connected to the touch electrodes; the touch chip is configured to detect a capacitance change value of each touch electrode according to an output signal supplied by the active touch pen which is received by each touch electrode, the capacitance change value of each touch electrode increases with an increasing of the signal amplitude of the output signal supplied by the active touch pen, and the capacitance change value of each touch electrode decreases with an decreasing of the signal amplitude of the output signal supplied by the active touch pen.

Optionally, the touch input system further includes: a display chip configured to display, according to the capacitance change value of each touch electrode detected by the touch chip, a handwriting of the active touch pen at a touch position;

where a width of the handwriting of the touch pen increases with an increasing of the capacitance change value of each touch electrode, and the width of the handwriting of the touch pen decreases with a decreasing of the capacitance change value of each touch electrode.

A method of driving a touch input system is provided in the present disclosure, applied to the touch input system hereinabove, including:

detecting, by the control circuit of the active touch pen, a detection parameter value corresponding to an inclination angle of the active touch pen, and adjusting, according to the detection parameter value, a signal amplitude of an output signal supplied by the signal supply circuit;

supplying, by the signal supply circuit of the active touch pen, the output signal through the pen tip; and detecting, by a touch chip of the touch component, a capacitance change value of each touch electrode of the touch component according to an output signal supplied by the signal supply circuit which is received by each touch electrode of the touch component, where the capacitance change value of each touch electrode increases with an increasing of the signal amplitude of the output signal supplied by the active touch pen, and the capacitance change value of each touch electrode decreases with an decreasing of the signal amplitude of the output signal supplied by the active touch pen.

Optionally, the driving method further includes:

displaying, by a display chip, according to the capacitance change value of each touch electrode detected by the touch chip, a handwriting of the active touch pen at a touch position;

where a width of the handwriting of the touch pen increases with an increasing of the capacitance change value of each touch electrode, and the width of the handwriting of the touch pen decreases with a decreasing of the capacitance change value of each touch electrode.

Optionally, the control circuit includes a resistance adjustment component, and a resistance value of the resistance adjustment component increases or decreases with a change of the inclination angle of the active touch pen, the detecting, by the control circuit of the active touch pen, the detection parameter value corresponding to the inclination angle of the active touch pen, and adjusting, according to the detection parameter value, the signal amplitude of the output signal supplied by the signal supply circuit, includes:

detecting a resistance change of the resistance adjustment component, and adjusting, according to the resistance value of the resistance adjustment component, the signal amplitude of the output signal supplied by the signal supply circuit.

Optionally, the pen body of the active touch pen includes an accommodating cavity, the resistance adjustment component is in the accommodating cavity, and the resistance adjustment component includes a conductive liquid in the accommodating cavity, a volume of the conductive liquid is smaller than a volume of the accommodating cavity, the resistance adjustment component further includes a resistance element or a conductive element, where the resistance element is through the accommodating cavity and is in electrical contact with the conductive liquid, and both ends of the resistance element are electrically connected to the control circuit, or one end of the conductive element is at an end of the accommodating cavity and is electrically connected to the control circuit, and the other end of the conductive element extends into the accommodating cavity and is in electrical contact with the conductive liquid in the accommodating cavity;

the detecting the resistance change of the resistance adjustment component, and adjusting, according to the resistance value of the resistance adjustment component, the signal amplitude of the output signal supplied by the signal supply circuit, includes:

detecting a resistance value of the conductive liquid, and adjusting the signal amplitude of the output signal supplied by the signal supply circuit according to the detected resistance value of the conductive liquid.

BRIEF DESCRIPTION OF THE DRAWINGS

In order to more clearly explain the technical solutions of the embodiments of the present disclosure, the drawings required for the description of the embodiments of the present disclosure will be briefly described below. Obviously, the drawings in the following description are only some embodiments of the present disclosure. For those of ordinary skill in the art, other drawings may also be obtained based on these drawings with any creative work.

DETAILED DESCRIPTION

The technical solutions in the embodiments of the present disclosure will be described clearly and completely in conjunction with the drawings in the embodiments of the present disclosure. Obviously, the described embodiments are part of the embodiments of the present disclosure, but not all of the embodiments. Based on the embodiments in the present disclosure, all other embodiments obtained by a person of ordinary skill in the art without creative work fall within the scope of the present disclosure.

An active touch pen is provided in some embodiments of the present disclosure, applied to a touch component.

Figure 1:
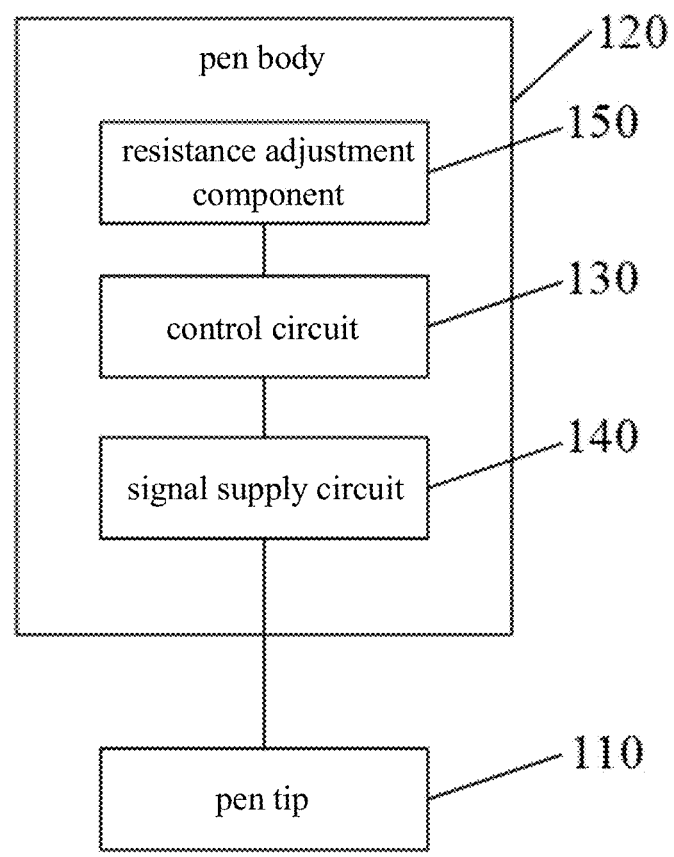
FIG. 1 is a schematic structural diagram of an active touch pen in some embodiments of the present disclosure.

As shown in FIG. 1, the active touch pen includes a pen tip 110 and a pen body 120, where a control circuit 130 and a signal supply circuit 140 are in the pen body 120.

The control circuit 130 is configured to detect a detection parameter value corresponding to an inclination angle of the pen body, and adjust, according to the detection parameter value, a signal amplitude of an output signal supplied by the signal supply circuit 140. An input end of the signal supply circuit 140 is connected to an output end of the control circuit 130, and the output end of the signal supply circuit 140 is connected to the pen tip 110, and the signal supply circuit 140 is configured to supply the output signal through the pen tip 110.

In some embodiments of the present disclosure, the inclination angle of the pen body 120 of the active touch pen refers to the angle between the axial direction of the pen body 120 (the direction shown by the arrows in FIGS. 2 to 4) and the horizontal direction (i.e., angle α in the drawings).

The active touch pen provided in some embodiments of the present disclosure is configured to cooperate with the touch component so as to provide an output signal that may be recognized by the touch component.

Specifically, the touch control component may be arranged in electronic devices such as mobile phones, tablet computers, laptop portable computers, vehicle-mounted computers or desktop computers. When the active touch pen is turned on, it always provides an output signal. When the touch component detects the output signal supplied by the active touch pen, it generates corresponding input information in the electronic device.

The active touch pen is provided with a control circuit 130 that detects the detection parameter value corresponding to the inclination angle of the active touch pen through a sensor. The inclination angle of the active touch pen here refers to the angle between the active touch pen and the horizontal direction.

Further, the control circuit 130 adjusts the signal amplitude of the output signal supplied by the signal supply circuit 140 according to the detected detection parameter value.

In some embodiments of the present disclosure, the control circuit 130 detects the detection parameter value of the active touch pen, and adjusts the signal amplitude of the output signal according to the detected detection parameter value of the active touch pen, and the touch component generates the corresponding input information according to the output signal.

The signal supply circuit 140 in the active touch pen is configured to supply a corresponding output signal through the pen tip 110. The signal supply circuit 140 may further include a signal amplifying circuit configured to amplify by a certain ratio the output signal adjusted by the control circuit 130, so as to meet the signal strength range required in actual use.

In some embodiments of the present disclosure, the control circuit 130 detects the detection parameter value corresponding to the inclination angle of the active touch pen and adjusts the signal amplitude of the output signal according to the detected detection parameter value, thereby simplifying the control and use of the active touch pen and improving the convenience of use. In addition, compared with the active pen using a pressure sensor in the related art, since there is no sensor such as a pressure sensor, the cost of the active touch pen is lower, and the power consumption during use is relatively low, thereby reducing the cost and power consumption.

Further, the control circuit 130 further includes a resistance adjustment component 150 in the pen body 120, the resistance value of the resistance adjustment component 150 changes with the change of the inclination angle of the pen body 120, and the control circuit 130 enlarges or reduces the output signal based on the change of the resistance value of the resistance adjustment component 150.

In some embodiments of the present disclosure, the inclination angle of the pen body 120 is detected by the resistance adjustment component 150, and the resistance value of the resistance adjustment component 150 changes with the change of the inclination angle of the pen body 120. When the angle changes, the resistance value of the resistance adjustment component 150 also changes, and the control circuit 130 adjusts the signal amplitude of the output signal according to the resistance value of the resistance adjustment component 150, thereby adjusting the signal amplitude of the output signal.

In some embodiments of the present disclosure, the pen body 120 of the active touch pen includes a housing 151, and an accommodating cavity 153 is formed in the housing 151, and the resistance adjustment assembly 150 includes a conductive liquid 154, and the conductive liquid 154 is accommodated in the accommodating cavity 153. Moreover, the volume of the conductive liquid 154 is smaller than the volume of the accommodating cavity 153, so that the conductive liquid 154 may also flow in the accommodating cavity 153, and when the inclination angle of the pen body 120 changes, the shape of the conductive liquid 154 also changes accordingly. It should be understood that the liquid does not have a fixed shape, and the shape of the conductive liquid 154 here refers to the outline and state of the conductive cavity 154 formed by the accommodating cavity 153.

Figure 2:
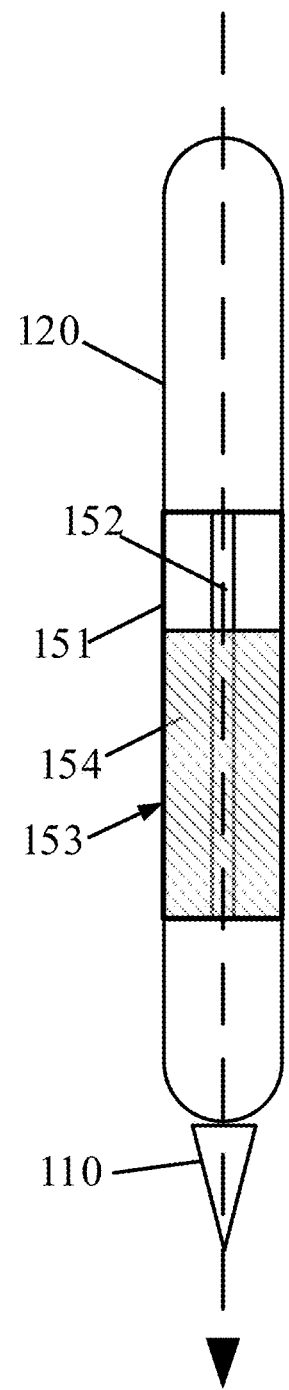
FIG. 2 is a schematic structural diagram of an active touch pen in some embodiments of the present disclosure.
Figure 3:
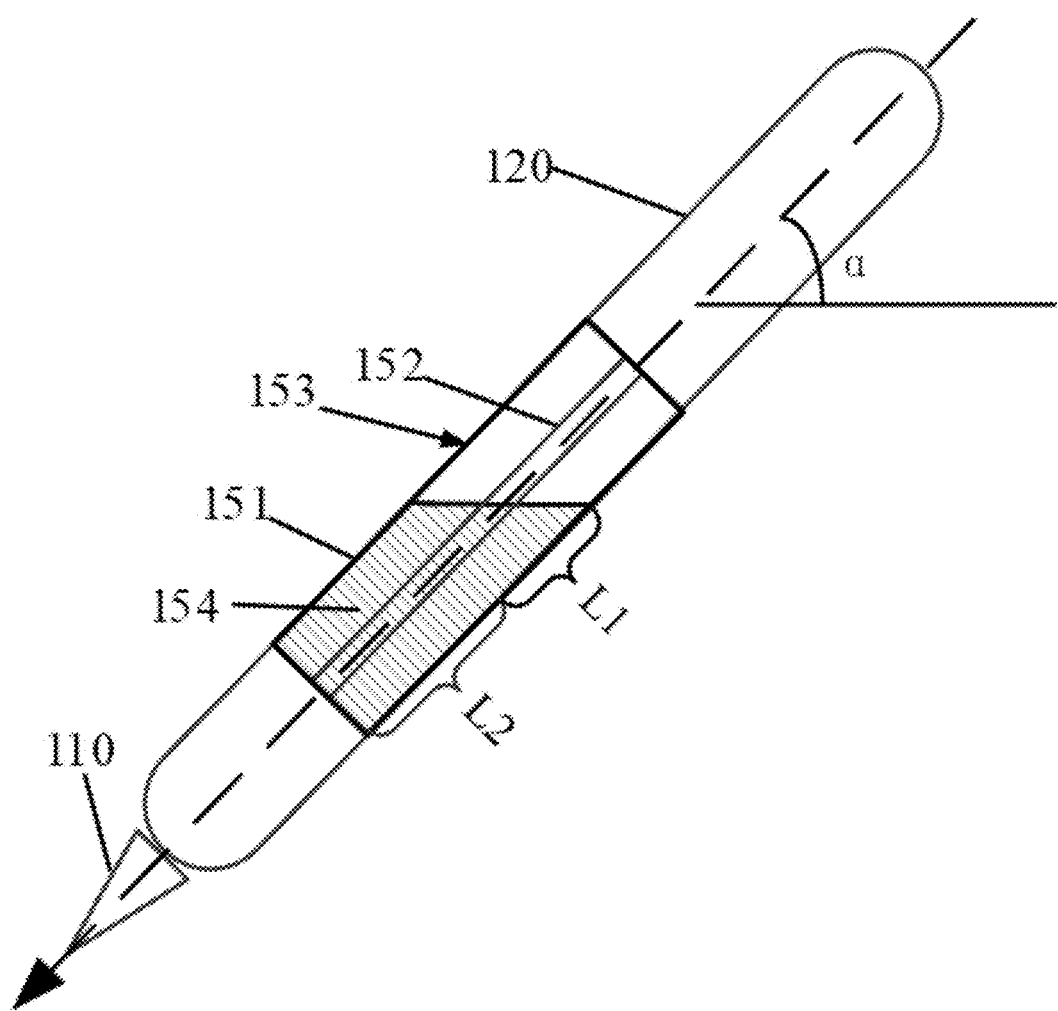
FIG. 3 is a using state diagram of an active touch pen in some embodiments of the present disclosure.
Figure 4:
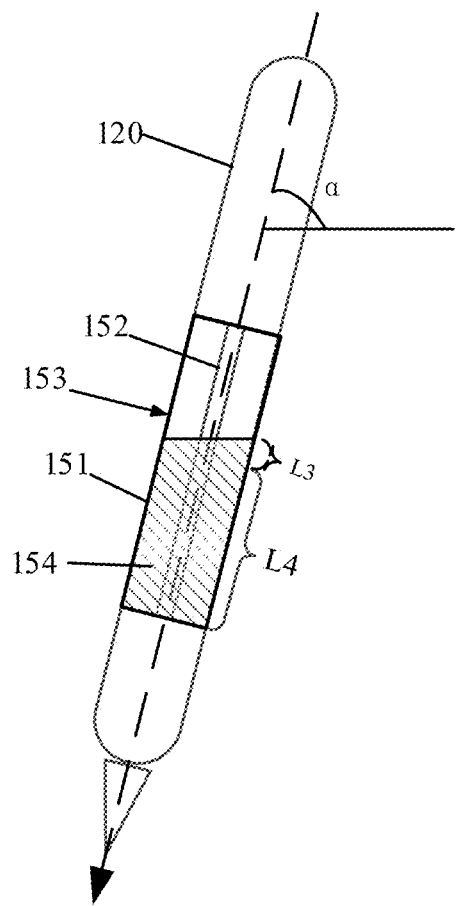
FIG. 4 is a using state diagram of a use of an active touch pen in some embodiments of the present disclosure.

As shown in FIGS. 2 to 4, since the volume of the conductive liquid 154 is smaller than the volume of the accommodating cavity 153, the shape of the conductive liquid 154 also changes when the inclination angle of the pen body 120 changes.

Since the conductive liquid 154 is a liquid with fluidity, the larger the inclination angle of the pen body 120 is, the smaller the length of the conductive liquid 154 will be, and the cross-sectional area of a portion of the conductive liquid 154 will increase; the smaller the inclination angle of the pen body 120 is, the longer the length of the conductive liquid 154 will be, and the cross-sectional area of a part of the conductive liquid 154 will decrease.

In some embodiments of the present disclosure, the length of the conductive liquid 154 refers to the distribution length of the conductive liquid 154 in the axial direction of the active touch pen, and the cross-sectional area of the conductive liquid 154 refers to the cross-sectional area in the direction perpendicular to the axis direction of the pen body 120.

Specifically, as shown in FIGS. 3 and 4, in the use state shown in FIG. 3, the length of the conductive liquid 154 is L1+L2, and in the use state shown in FIG. 4, the length of the conductive liquid 154 is L3+L4. The cross-sectional area of the conductive liquid 154 corresponding to L1 and L3 is smaller than the cross-sectional area of the accommodating cavity 153, and the cross-sectional area of the conductive liquid 154 corresponding to L2 and L4 is equal to the cross-sectional area of the accommodating cavity 153.

Compared with the use state shown in FIG. 3, the inclination angle of the pen body 120 in the use state shown in FIG. 4 is larger, so in the state shown in FIG. 4, the length of the conductive liquid 154 is smaller, that is, L1+L2 is greater than L3+L4. The cross-sectional area of a part of the conductive liquid will become smaller, that is, the part corresponding to L1 and L3 shown in the figure, L3 is smaller than L1, that is, in the state of FIG. 4, the conductive liquid 154 with a smaller cross-sectional area becomes fewer.

The resistance calculation formula is: $R=\rho*L/S$, where R is the resistance value, the unit is ohm ($\Omega$), $\rho$ is the resistivity of the resistance material in the unit of ohm meter ($\Omega*m$), L is the resistance length in the unit of meter (m), S is the resistance cross-sectional area in the unit of square meter ($m^2$). Therefore, as the length of the conductive liquid 154 increases and the cross-sectional area decreases, the resistance becomes larger.

Therefore, as can be seen from the above analysis, the larger the inclination angle of the pen body 120 is, the smaller the resistance of the conductive liquid 154 will be, and the smaller the inclination angle of the pen body 120 is, the greater the resistance of the conductive liquid 154 will be.

In some embodiments of the present disclosure, as shown in FIG. 2 to FIG. 4, the resistance element 152 is further included, and the resistance element 152 is through the accommodating cavity 153 so that the conductive liquid 154 is in electrical contact with the resistance element 152 during use. In other words, the length of the resistance element in the axial direction of the accommodating cavity is equal to the length of the accommodating cavity in the axial direction of the accommodating cavity.

For example, as shown in FIGS. 2 to 4, the accommodating cavity includes a first end surface, the end of the resistance element includes a first end, and the first end of the resistance element is electrically connected to the control circuit through the first end surface. The accommodating cavity further includes a second end surface opposite to the first end surface, the end of the resistance element further includes a second end, and the second end of the resistance element is electrically connected to the second end surface of the accommodating cavity.

It should be understood that the resistance adjustment component 150 implements the resistance adjustment function through the conductive liquid 154, and the resistance element 152 is mainly used to implement the conduction function. During the use, the control circuit 130 provides a voltage applied to two ends of the resistance element. At this time, the resistance element 152 and the control circuit 130 form a close loop. Since the conductive liquid 154 is in electrical contact with the resistance element 152, current also flows through the conduction liquid 154 in this way. When the resistance of the conductive liquid 154 changes, the current flowing through the conductive liquid 154 also changes. The control circuit 130 detects such a current change, and accordingly adjusts the signal amplitude of the output signal.

Figure 5:
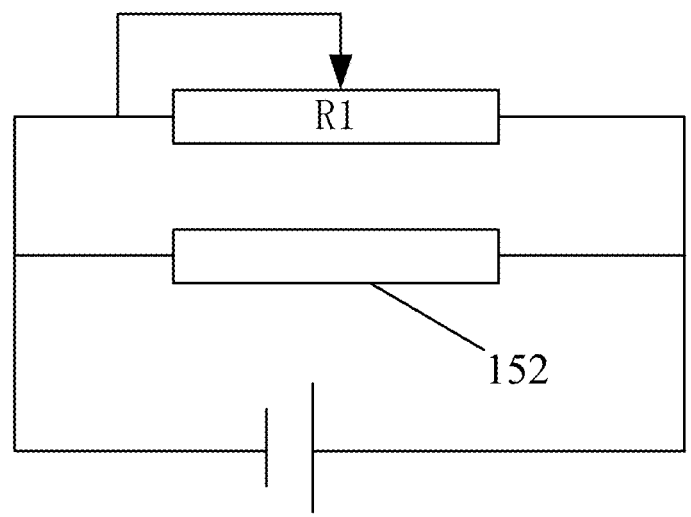
FIG. 5 is an equivalent circuit diagram of the resistance adjustment element in the active touch pen shown in FIG. 2.

As shown in FIG. 5, the conductive liquid 154 is equivalent to forming a variable resistor R1 connected in parallel with the resistance element 152. In this way, when the inclination angle of the pen body 120 changes, the resistance of the variable resistor R1 formed by the conductive liquid 154 also changes accordingly.

It should be understood that the resistance value between the two ends of the resistance element 152 is the resistance value of the variable resistor R1 formed by the conductive liquid 154 in parallel with the resistance element 152, so when the inclination angle of the pen body 120 changes, the resistance value of the variable resistor R1 formed by the conductive liquid 154 changes, so that the resistance value between two ends of the resistance element 152 changes accordingly.

During the use, the inclination angle of the active touch pen becomes larger. For example, the active touch pen may be adjusted from the state shown in FIG. 3 to the state shown in FIG. 4. In this process, since the length of the conductive liquid 154 becomes shorter and the portion with a smaller cross-sectional area also becomes shorter, so the resistance of the conductive liquid 154 decreases. Since the voltage supplied by the control circuit 130 is a certain value, when the resistance of the conductive liquid 154 decreases, the current will increase accordingly.

During another use, the inclination angle of the active touch pen becomes smaller, for example, the active touch pen may be adjusted from the state shown in FIG. 4 to the state shown in FIG. 3. In this process, since the length of the conductive liquid 154 becomes longer and the portion with a smaller cross-sectional area also becomes longer, the resistance of the conductive liquid 154 increases.

It should be understood that the resistance element 152 should have a sufficiently large resistance. If the resistance value of the resistance element 152 is too small, the total resistance value after a parallel connection will be too small. In this way, the resistance change of the conductive liquid 154 will affect the total resistance in a small degree, which may decrease the measurement accuracy.

The resistance element 152 in some embodiments of the present disclosure may be made of a conductive material, such as various conductors or semiconductor materials. In some embodiments of the present disclosure, the resistance element 152 may include nickel-chromium alloy, iron, tungsten, and other relatively large resistivity materials, so as to increase the resistance of the resistance element 152. In some embodiments of the present disclosure, by reducing the cross-sectional area of the resistance element 152 or increasing the length of the resistance element 152, the resistance element 152 may have a large enough resistance.

The resistance element 152 may be a resistor whose resistance value is greater than the minimum resistance value of the conductive liquid 154 and less than the maximum resistance value of the conductive liquid 154, so that the resistance value change between the two ends of the resistance element 152 is more obvious, which is beneficial to improve the measurement accuracy. Obviously, when the inclination angle of the pen body 120 is 90 degrees, that is, the pen body 120 is placed vertically, the resistance value of the conductive liquid 154 is the smallest; when the inclination angle of the pen body 120 is 0 degrees, that is, when the pen body 120 is placed horizontally, the resistance value of the conductive liquid 154 is the largest.

Figure 6:
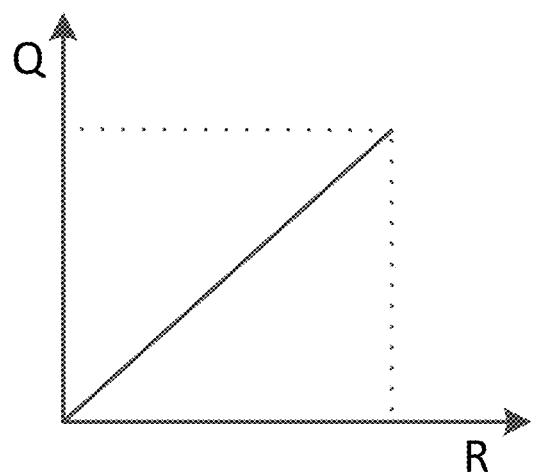
FIG. 6 shows a relationship between a signal amplitude of an output signal supplied by an active touch pen and a resistance value of a resistance adjustment element in some embodiments of the present disclosure.

In some embodiments of the present disclosure, the signal amplitude of the output signal may be set to decrease as the current value in the resistance adjustment component 150 increases, for example, the signal amplitude $Q=k/I$, $I=U/R$. As shown in FIG. 6, it can be concluded that $Q=k*R/U$, and the slope $k/U$ of the straight line in FIG. 6 is a fixed value, so Q and R have a proportional relationship.

In some embodiments of the present disclosure, the signal amplitude of the output signal may also be set to increase as the current value in the resistance adjustment component 150 increases, for example, it may be set to Q=k*I, then Q=k*U/R, that is, Q and R are inversely proportional.

In the above formula, Q is the signal amplitude, k is the preset proportional coefficient, I is the total current flowing through the resistance adjustment component 150, U is the voltage applied across the resistance adjustment component 150, where the voltage is a fixed value, and R is the resistance value of the resistance adjustment component 150.

Figure 7:
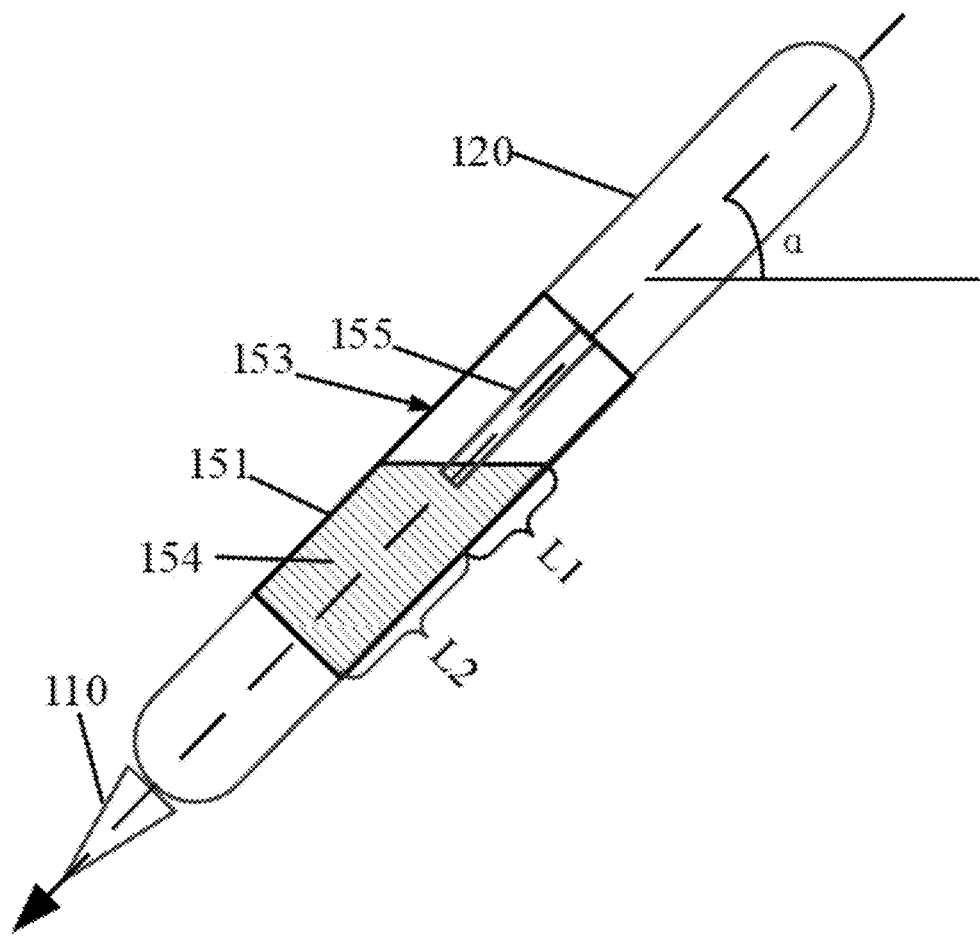
FIG. 7 is a schematic structural diagram of an active touch pen in some embodiments of the present disclosure.

In another embodiment, as shown in FIG. 7, the resistance adjustment assembly 150 further includes a conductive element 155. The conductive element 155 is disposed at the end of the accommodating cavity 153, and the other end extends into the accommodating cavity 153 and is in electrical contact with the conductive liquid 154 in the accommodating cavity 153.

For example, the accommodating cavity includes a first end surface, and the end of the resistance element includes a first end, and the first end of the resistance element is electrically connected to the control circuit through the first end surface.

The resistance change in this embodiment is also achieved by the shape change of the conductive liquid 154. The conductive original 155 is mainly used to realize the conduction function. Specifically, the conductive liquid 154 is connected to the control circuit 130. During the use, the current passes through the conductive element 155 and the conductive liquid 154 and forms a close loop.

The conductive element 155 in some embodiments of the present disclosure may be a conductive rod, the fixed end of which is fixed on the inner wall of the accommodating cavity 153, and the free end thereof extends into the accommodating cavity 153.

The conductive element 155 may also be a conductive sheet or a wire. For example, the conductive elements 155 may be conductive sheets distributed along the side wall of the container 153.

Figure 8:
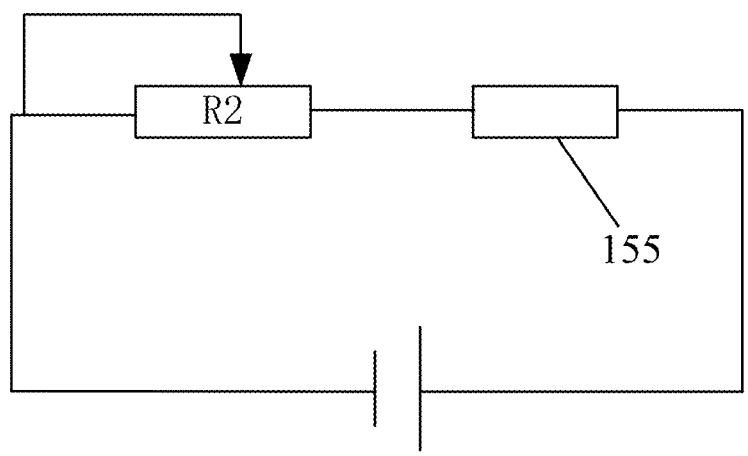
FIG. 8 is an equivalent circuit diagram of the resistance adjustment element in the active touch pen shown in FIG. 7.

The conductive element 155 is in contact with the conductive liquid 154. As shown in FIG. 8, the conductive element 155 is connected in series with the variable resistor R2 formed by the conductive liquid 154.

In this way, when the inclination angle of the pen body 120 changes, the resistance of the variable resistor R2 formed by the conductive liquid 154 also changes accordingly. Thus, the total resistance value of the variable resistor R2 formed by the conductive liquid 154 and the conductive element 155 connected to the conductive liquid 154 in series changes.

Specifically, during one use, the inclination angle of the active touch pen becomes larger, for example, the active touch pen may be adjusted from the state shown in FIG. 3 to the state shown in FIG. 4. In this process, since the length of the conductive liquid 154 becomes shorter and the portion with a smaller cross-sectional area also becomes shorter, the resistance of the conductive liquid 154 decreases.

During another use, the inclination angle of the active touch pen becomes smaller, for example, the active touch pen may be adjusted from the state shown in FIG. 4 to the state shown in FIG. 3. In this process, since the length of the conductive liquid 154 becomes longer and the portion with a smaller cross-sectional area also becomes longer, the resistance of the conductive liquid 154 increases.

The material of the conductive element 155 may include a material with a relatively high resistivity, such as nickel-chromium alloy, or a material with a relatively low resistivity, such as copper, carbon nanotubes, and graphite, as long as the current can be conducted.

Generally, during use of the active touch pen, the pen tip 110 is located in the downward direction. Therefore, as shown in FIG. 7, in some embodiments of the present disclosure, only one conductive element 155 may be provided, and the conductive element 155 is at the end of the accommodating cavity 153 away from the pen tip 110, that is, the conductive element 155 is located above the accommodating cavity 153, and the lower part of the accommodating cavity 153 may be connected to the control circuit 130 through a terminal extending into the accommodating cavity 153.

Figure 9:
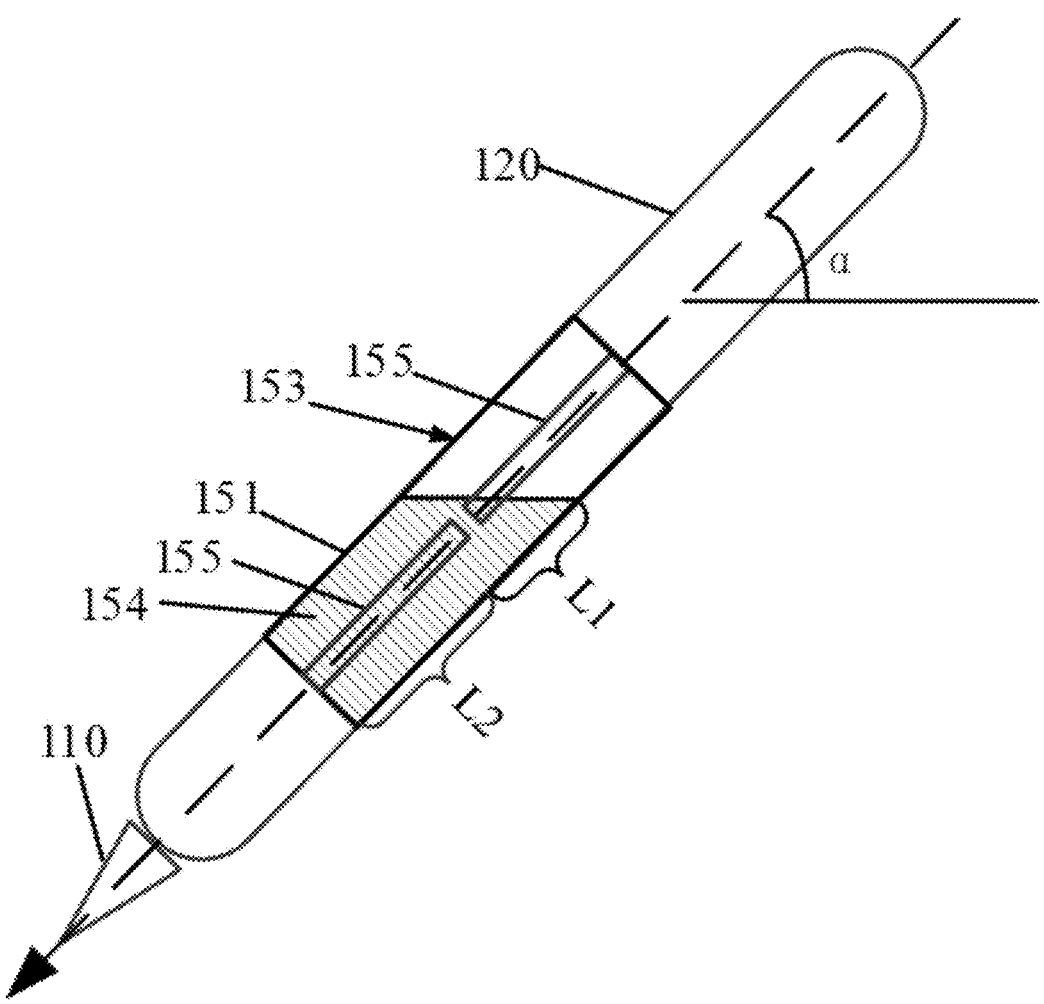
FIG. 9 is a schematic structural diagram of an active touch pen in some embodiments of the present disclosure.

Further, as shown in FIG. 9, in some embodiments of the present disclosure, there are two conductive elements 155, and the two conductive elements 155 are respectively arranged at two ends of the accommodating cavity 153. In this way, even if the tip of the active touch pen is used upward, it may be ensured that the conductive liquid 154 is in contact with the conductive element 155, so as to prevent the normal use of the active touch pen due to the circuit break.

For example, as shown in FIG. 9, the accommodating cavity includes a first end surface, the end of the resistance element includes a first end, and the first end of the resistance element is electrically connected to the control circuit through the first end surface. The accommodating cavity further includes a second end surface opposite to the first end surface, the end of the resistance element further includes a second end, and the second end of the resistance element is electrically connected to the second end surface of the accommodating cavity. In addition, the resistance element includes a disconnection portion extending in the axial direction of the accommodating cavity, so that the resistance element is separated in the axial direction of the accommodating cavity, and the conductive liquid is filled in the disconnection portion.

In some embodiments of the present disclosure, the accommodating cavity 153 is columnar, for example, it may be cylindrical, the resistance element 152 may be rod-shaped and arranged in the accommodating cavity 153 along the axial direction of the accommodating cavity 153, and the resistance element 152 may also be a sheet-shaped and is arranged in the accommodating cavity 153 or attached to the inner wall of the accommodating cavity 153.

Further, the conductive liquid 154 is an aqueous solution of a strong electrolyte, for example, an aqueous solution of a metal salt such as sodium chloride or dilute sulfuric acid, etc., as long as the conductive effect can be achieved, the conductive element 155 may include copper or graphite material. Optionally, the conductive element 155 is made of copper and has stable chemical properties, which is not easily corroded and does not easily react with the conductive liquid 154.

Further, the active touch pen further includes a resistance control switch, and the resistance control switch is configured to control the on-off of the resistance adjustment component 150.

When the amplitude of the output signal does not need to be adjusted, the resistance adjustment component 150 may be turned off by turning off the resistance control switch, and at this time, the output signal with a fixed amplitude can be output.

The amplitude of the output signal after the resistance control switch is turned off may be a fixed value, or it may be equal to the amplitude of the output signal before the resistance control switch is turned off.

A touch input system is further provided in the present disclosure, including a touch component and an active touch pen, where the active touch pen is any one of the above-mentioned active touch pen.

The touch component includes a plurality of touch electrodes and a touch chip connected to the touch electrodes; the touch chip is configured to detect a capacitance change value of each touch electrode according to an output signal supplied by the active touch pen which is received by each touch electrode. The capacitance change value of each touch electrode increases with an increasing of the signal amplitude of the output signal supplied by the active touch pen, and the capacitance change value of each touch electrode decreases with a decreasing of the signal amplitude of the output signal supplied by the active touch pen.

The touch electrodes of the touch component include a Tx electrode and a Rx electrode. During the use, a coupling capacitance may be formed between the Tx electrode and the Rx electrode. When the user's hand or other conductor touches the touch component, the mutual capacitance between the Tx electrode and the Rx electrode (that is, the capacitance value of the coupling capacitance) decreases. By scanning the electrode matrix, this change in coupling capacitance is detected so that the touch position may be calculated.

Figure 10:
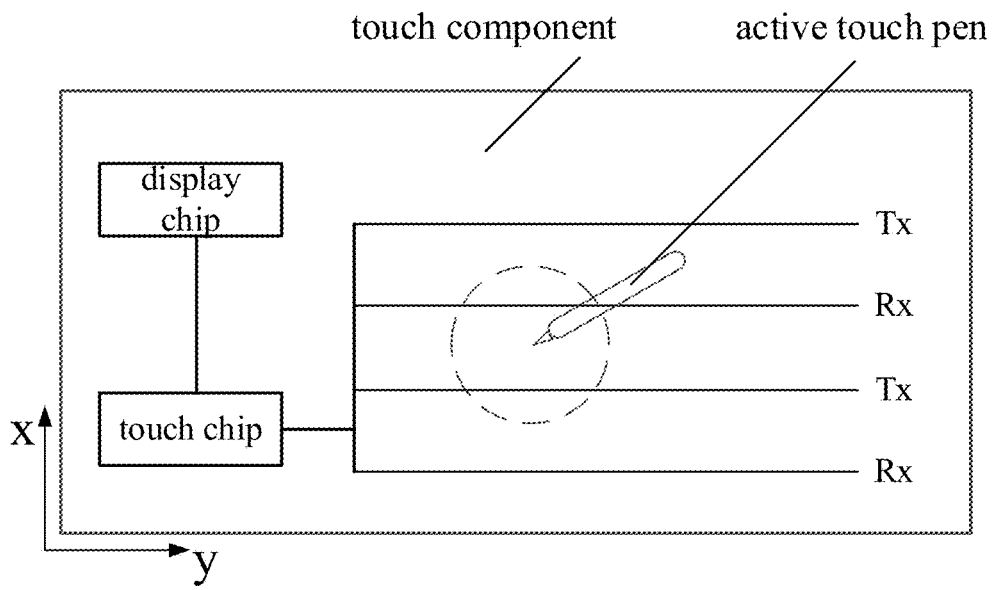
FIG. 10 is a schematic diagram of an operation of a touch component in some embodiments of the present disclosure.
Figure 11:
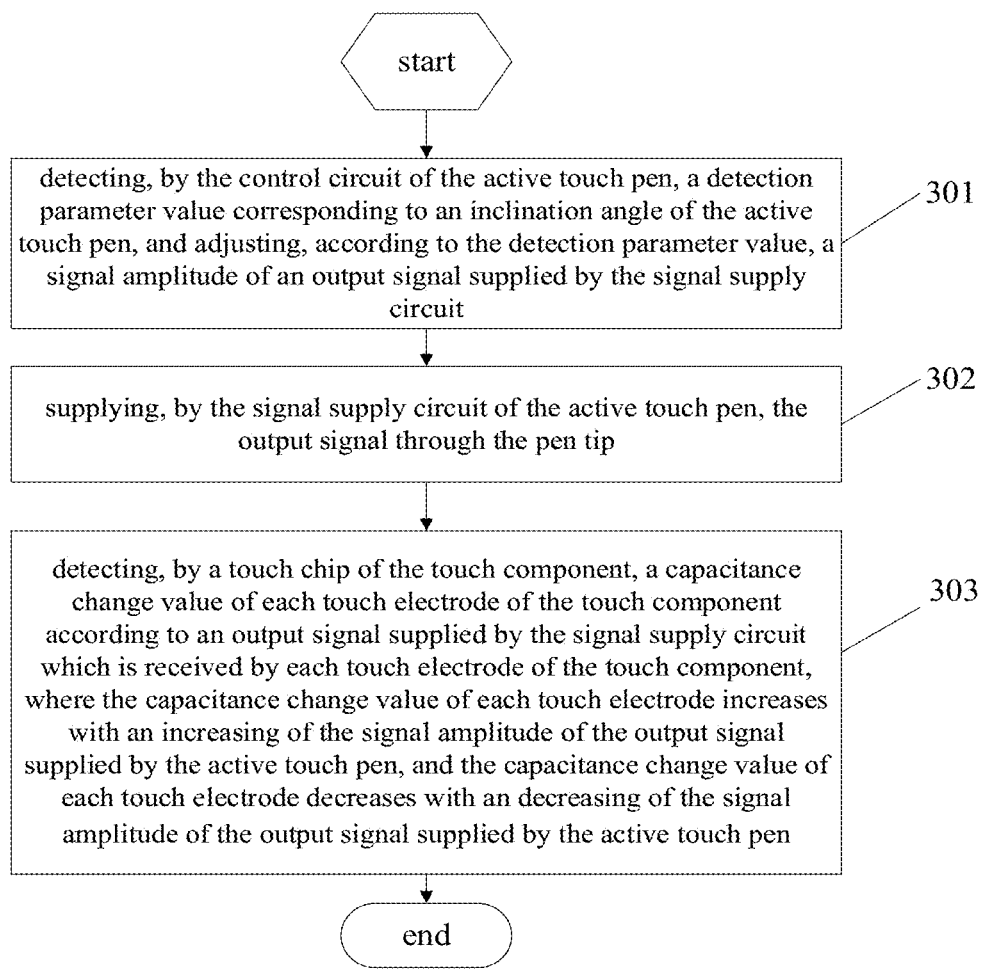
FIG. 11 is a flowchart of a method of driving a touch input system in some embodiments of the present disclosure.

As shown in FIG. 10, when the active touch pen touches and writes, the pen tip 110 supplying the output signal serves as the Tx electrode, and the touch electrode of the touch component also serves as the receiving electrode. At this time, the coupling capacitance is the mutual capacitance between the pen tip 110 and the receiving electrode. Since there is only pen tip 110 as one analog Tx channel, it is impossible to scan the entire frame and column. The touch chip may locate the coordinates of the touch point of the active touch pen by locating the intersection of the capacitance peaks on the X and Y axes.

The touch chip may also detect the capacitance change value of each touch electrode according to the output signal supplied by the active touch pen through the pen tip 110 which is received by each touch electrode. The capacitance change value changes with the change of the signal amplitude of the output signal of the active touch pen. Specifically, the capacitance change value increases as the amplitude of the output signal increases, and decreases as the amplitude of the output signal decreases.

According to the embodiment of the present disclosure, the control circuit 130 detects the posture of the active touch pen and supplies an output signal according to the state of the active touch pen, thereby simplifying the control and use process of the active touch pen and improving the convenience of use.

Further, the touch component further includes: a display chip configured to display, according to the capacitance change value of each touch electrode detected by the touch chip, a handwriting of the active touch pen at a touch position. A width of the handwriting of the touch pen increases with an increasing of the capacitance change value of each touch electrode, and the width of the handwriting of the touch pen decreases with a decreasing of the capacitance change value of each touch electrode.

In some embodiments of the present disclosure, the larger the capacitance of each touch electrode is, the larger the width of the handwriting of the active touch pen will be, or the larger the capacitance of each touch electrode is, the smaller the width of the handwriting will be.

In this way, during the use, the width of the handwriting of the active touch pen may be adjusted by controlling the state of the active touch pen, thereby improving the convenience of use. At the same time, compared with the active pen using a pressure sensor in the related art, the cost of the active touch pen is lower and the power consumption during use is relatively low, thereby reducing the cost and power consumption.

A method of driving a touch input system is further provided in some embodiments of the present disclosure. As shown in FIG. 15, the method includes:

Step 301: detecting, by the control circuit of the active touch pen, a detection parameter value corresponding to an inclination angle of the active touch pen, and adjusting, according to the detection parameter value, a signal amplitude of an output signal supplied by the signal supply circuit;

Step 302: supplying, by the signal supply circuit of the active touch pen, the output signal through the pen tip; and Step 303: detecting, by a touch chip of the touch component, a capacitance change value of each touch electrode of the touch component according to an output signal supplied by the signal supply circuit which is received by each touch electrode of the touch component, where the capacitance change value of each touch electrode increases with an increasing of the signal amplitude of the output signal supplied by the active touch pen, and the capacitance change value of each touch electrode decreases with an decreasing of the signal amplitude of the output signal supplied by the active touch pen.

The active touch pen in some embodiments of the present disclosure may refer to the active touch pen in the above embodiments, and the touch component may also refer to the touch component in the above embodiments, which will not be repeated here.

During the use, the control circuit 130 in the active touch pen detects the detection parameter value corresponding to the inclination angle of the active touch pen, and controls the signal amplitude of the output signal according to the detected detection parameter value.

In some embodiments of the present disclosure, the greater the angle between the active touch pen and the horizontal plane is, that is, the greater the angle value of the angle α shown in FIGS. 3 and 4 is, the larger the signal amplitude of the output signal will be; the smaller the angle between the active touch pen and the horizontal plane is, the smaller the signal amplitude of the output signal will be.

During the use, the inclination angle of the active touch pen becomes larger. For example, the active touch pen may be adjusted from the state shown in FIG. 3 to the state shown in FIG. 4. In this process, since the length of the conductive liquid 154 becomes shorter and the portion with a smaller cross-sectional area also becomes shorter, the resistance of the conductive liquid 154 decreases. Since the voltage supplied by the control circuit 130 is a certain value, when the resistance of the conductive liquid 154 decreases, the current will increase accordingly. When the control circuit 130 detects an increasing of current, the control circuit 130 may increase the signal amplitude of the output signal.

During another use, the inclination angle of the active touch pen becomes smaller, for example, the active touch pen may be adjusted from the state shown in FIG. 4 to the state shown in FIG. 3. In this process, since the length of the conductive liquid 154 becomes longer and the portion with a smaller cross-sectional area also becomes longer, the resistance of the conductive liquid 154 increases. Since the voltage supplied by the control circuit 130 is a certain value, when the resistance of the conductive liquid 154 increases, the current also decreases. When the control circuit 130 detects that the current decreases, the control circuit 130 may reduce the signal amplitude of the output signal. The signal supply circuit 140 in the active touch pen supplies the output signal through the pen tip 110 of the active touch pen.

When the output signal is detected by the touch electrode in the touch component, specifically, when the active touch pen is in contact with the touch component, the coupling capacitance formed between the touch electrode and the pen tip 110 of the active touch pen changes, the touch component may generate corresponding input information according to the capacitance change of the coupling capacitance.

Optionally, the method further includes: displaying, by a display chip, according to the capacitance change value of each touch electrode detected by the touch chip, a handwriting of the active touch pen at a touch position; where a width of the handwriting of the touch pen increases with an increasing of the capacitance change value of each touch electrode, and the width of the handwriting of the touch pen decreases with a decreasing of the capacitance change value of each touch electrode.

In some embodiments of the present disclosure, it can be set that the larger the capacitance of each touch electrode is, the larger the width of the handwriting of the active touch pen will be, or that the larger the capacitance of each touch electrode is, the smaller the width of the handwriting of the active touch pen will be.

The display chip controls the thickness of the displayed handwriting of the active touch pen according to the detected capacitance change of each touch electrode.

In some embodiments of the present disclosure, the larger the capacitance of each touch electrode is, the larger the width of the handwriting of the active touch pen will be.

As shown in FIGS. 3 and 4, when the inclination angle of the active touch pen increases, for example, the state shown in FIG. 3 is switched to the state shown in FIG. 4, the amplitude of the output signal supplied by the active touch pen increase, when the active touch pen is in contact with the touch component, the capacitance change value of the corresponding touch electrode also increases. Accordingly the width of the handwriting of the active touch pen is increased by the control of the display chip.

When the inclination angle of the active touch pen is reduced, for example, the state shown in FIG. 4 is switched to the state shown in FIG. 3, the signal amplitude of the output signal supplied by the active touch pen is reduced, when the active touch pen is in contact with the touch component, the capacitance change of the corresponding touch electrode is also reduced accordingly. Accordingly the width of the handwriting of the active touch pen is reduced by the control of the display chip.

In this way, by adjusting the inclination angle of the active touch pen, the handwriting width of the active touch pen may be adjusted.

When the user may adjust the handwriting width of the active touch pen by adjusting the posture of the active touch pen according to his own needs, for example, when the user thinks that the current handwriting width is too large, the user may reduce the inclination angle of the active touch pen; when the user thinks that the current handwriting width is too small, the user may increase the inclination angle of the active touch pen.

Obviously, the active touch pen is set such that the smaller the inclination angle of the active touch pen is, the greater the signal amplitude of the output signal will be, so the control process is on the contrary.

Optionally, when the control circuit 130 includes any one of the resistance adjustment components 150 in the foregoing embodiments, the foregoing step 301 includes:

detecting a resistance change of the resistance adjustment component 150, and adjusting, according to the resistance value of the resistance adjustment component 150, the signal amplitude of the output signal supplied by the signal supply circuit 140.

Since the resistance of the resistance adjustment component 150 may change with the change of the inclination angle of the active touch pen, in this way, during the use, the resistance value of the resistance adjustment component 150 may be adjusted by adjusting the inclination angle of the active touch pen, thereby adjusting the signal amplitude of the output signal.

Further, in the case where the resistance adjustment component 150 includes the conductive liquid 154 in the above embodiment, the detecting the resistance change of the resistance adjustment component 150, and adjusting, according to the resistance value of the resistance adjustment component 150, the signal amplitude of the output signal supplied by the signal supply circuit 140, includes:

detecting a resistance value of the conductive liquid 154, and adjusting the signal amplitude of the output signal supplied by the signal supply circuit 140 according to the resistance value of the conductive liquid 154.

In some embodiments of the present disclosure, when the inclination angle of the active touch pen changes, the resistance value of the conductive liquid 154 will also change. For details, reference may be made to the process that the resistance value of the conductive liquid 154 changes with the changing of the inclination angle of the active touch pen, which will not be repeated here.

In this way, when the inclination angle of the active touch pen changes, the resistance value of the conductive liquid 154 also changes. After the control circuit 130 acquires the change in the resistance value of the conductive liquid 154, the signal amplitude of the output signal may be further adjusted.

In this way, during the use, the width of the handwriting of the active touch pen may be adjusted by controlling the state of the active touch pen, thereby improving the convenience of use.

The above are only some embodiments of the present disclosure, but the scope of the present disclosure is not limited thereto, and any person skilled in the art may easily think of changes or replacements within the technical scope of in the present disclosure, which should fall within the scope of the present disclosure. Therefore, the scope of the present disclosure shall be subject to the scope of the claims.

What is claimed is:

1. An active touch pen, comprising a pen tip and a pen body, wherein a control circuit and a signal supply circuit are in the pen body;

wherein the control circuit is configured to detect a detection parameter value corresponding to an inclination angle of the pen body, and adjust, according to the detection parameter value, a signal amplitude of an output signal supplied by the signal supply circuit;

wherein an input end of the signal supply circuit is connected to an output end of the control circuit, and the output end of the signal supply circuit is connected to the pen tip, and the signal supply circuit is configured to supply the output signal through the pen tip;

wherein a resistance adjustment component is in the pen body, the resistance adjustment component is connected to the control circuit, and a resistance value of the resistance adjustment component increases or decreases with a change of the inclination angle of the pen body, and the control circuit is configured to control the signal amplitude of the output signal according to a change of the resistance value of the resistance adjustment component;

wherein the pen body comprises an accommodating cavity, the resistance adjustment component is in the accommodating cavity, the resistance adjustment component comprises a resistance element and a conductive liquid, a volume of the conductive liquid is smaller than a volume of the accommodating cavity;

wherein the resistance element is in electrical contact with the conductive liquid, and an end of the resistance element is electrically connected to the control circuit;

wherein the accommodating cavity comprises a first end surface, the end of the resistance element comprises a first end, and the first end of the resistance element is electrically connected to the control circuit through the first end surface;

wherein the accommodating cavity further comprises a second end surface opposite to the first end surface, and the end of the resistance element further comprises a second end, and the second end of the resistance element is electrically connected to the second end surface of the accommodating cavity; and wherein the resistance element comprises a disconnection portion extending in an axial direction of the accommodating cavity, to disconnect the resistance element in the axial direction of the accommodating cavity, the conductive liquid is filled in the disconnected portion.

2. The active touch pen according to claim 1, wherein the pen body comprises an accommodating cavity, the resistance adjustment component is in the accommodating cavity, the resistance adjustment component comprises a resistance element and a conductive liquid, a volume of the conductive liquid is smaller than a volume of the accommodating cavity;

the resistance element is through the accommodating cavity and is in electrical contact with the conductive liquid, and both ends of the resistance element are electrically connected to the control circuit.

3. The active touch pen according to claim 2, wherein the accommodating cavity is columnar, and the resistance element is arranged along an axial direction of the accommodating cavity.

4. The active touch pen according to claim 2, wherein the conductive liquid is an aqueous solution of a strong electrolyte, a material of the resistance element comprises at least one of iron, tungsten and nickel-chromium alloy.

5. The active touch pen according to claim 1, wherein the pen body comprises an accommodating cavity, the resistance adjustment component is in the accommodating cavity, the resistance adjustment component comprises a conductive element and a conductive liquid, a volume of the conductive liquid is smaller than a volume of the accommodating cavity;

one end of the conductive element is at an end of the accommodating cavity and is electrically connected to the control circuit, and the other end of the conductive element extends into the accommodating cavity and is in electrical contact with conductive liquid in the accommodating cavity.

6. The active touch pen according to claim 5, wherein there exist two conductive elements, and the two conductive elements are arranged at two ends of the accommodating cavity respectively.

7. The active touch pen according to claim 5, wherein the conductive liquid is an aqueous solution of a strong electrolyte, a material of the conductive element comprises copper or graphite.

8. The active touch pen according to claim 1, further comprising a resistance control switch configured to control an on-off of the resistance adjustment component.

9. The active touch pen according to claim 1, wherein a length of the resistance element in an axial direction of the accommodating cavity is equal to a length of the accommodating cavity in the axial direction of the accommodating cavity.

10. A touch input system, comprising a touch component and an active touch pen, wherein the active touch pen is the active touch pen according to claim 1;

the touch component comprises a plurality of touch electrodes and a touch chip connected to the touch electrodes; the touch chip is configured to detect a capacitance change value of each touch electrode according to an output signal supplied by the active touch pen which is received by each touch electrode, the capacitance change value of each touch electrode increases with an increasing of the signal amplitude of the output signal supplied by the active touch pen, and the capacitance change value of each touch electrode decreases with a decreasing of the signal amplitude of the output signal supplied by the active touch pen.

11. The touch input system according to claim 10, further comprising: a display chip configured to display, according to the capacitance change value of each touch electrode detected by the touch chip, a handwriting of the active touch pen at a touch position;

wherein a width of the handwriting of the touch pen increases with an increasing of the capacitance change value of each touch electrode, and the width of the handwriting of the touch pen decreases with a decreasing of the capacitance change value of each touch electrode.

12. A method of driving a touch input system, applied to the touch input system according to claim 10, comprising:

detecting, by the control circuit of the active touch pen, a detection parameter value corresponding to an inclination angle of the active touch pen, and adjusting, according to the detection parameter value, a signal amplitude of an output signal supplied by the signal supply circuit;

supplying, by the signal supply circuit of the active touch pen, the output signal through the pen tip; and detecting, by a touch chip of the touch component, a capacitance change value of each touch electrode of the touch component according to an output signal supplied by the signal supply circuit which is received by each touch electrode of the touch component, wherein the capacitance change value of each touch electrode increases with an increasing of the signal amplitude of the output signal supplied by the active touch pen, and the capacitance change value of each touch electrode decreases with an decreasing of the signal amplitude of the output signal supplied by the active touch pen.

13. The driving method according to claim 12, further comprising:

displaying, by a display chip, according to the capacitance change value of each touch electrode detected by the touch chip, a handwriting of the active touch pen at a touch position;

wherein a width of the handwriting of the touch pen increases with an increasing of the capacitance change value of each touch electrode, and the width of the handwriting of the touch pen decreases with a decreasing of the capacitance change value of each touch electrode.

14. The driving method according to claim 12, wherein the control circuit comprises a resistance adjustment component, and a resistance value of the resistance adjustment component increases or decreases with a change of the inclination angle of the active touch pen, the detecting, by the control circuit of the active touch pen, the detection parameter value corresponding to the inclination angle of the active touch pen, and adjusting, according to the detection parameter value, the signal amplitude of the output signal supplied by the signal supply circuit, comprises:

detecting a resistance change of the resistance adjustment component, and adjusting, according to the resistance value of the resistance adjustment component, the signal amplitude of the output signal supplied by the signal supply circuit.

15. The driving method according to claim 14, wherein the pen body of the active touch pen comprises an accommodating cavity, the resistance adjustment component is in the accommodating cavity, and the resistance adjustment component comprises a conductive liquid in the accommodating cavity, a volume of the conductive liquid is smaller than a volume of the accommodating cavity, the resistance adjustment component further comprises a resistance element or a conductive element, wherein the resistance element is through the accommodating cavity and is in electrical contact with the conductive liquid, and both ends of the resistance element are electrically connected to the control circuit, or one end of the conductive element is at an end of the accommodating cavity and is electrically connected to the control circuit, and the other end of the conductive element extends into the accommodating cavity and is in electrical contact with the conductive liquid in the accommodating cavity;

the detecting the resistance change of the resistance adjustment component, and adjusting, according to the resistance value of the resistance adjustment component, the signal amplitude of the output signal supplied by the signal supply circuit, comprises:

detecting a resistance value of the conductive liquid, and adjusting the signal amplitude of the output signal supplied by the signal supply circuit according to the detected resistance value of the conductive liquid.

* * * * *